Figure 1:
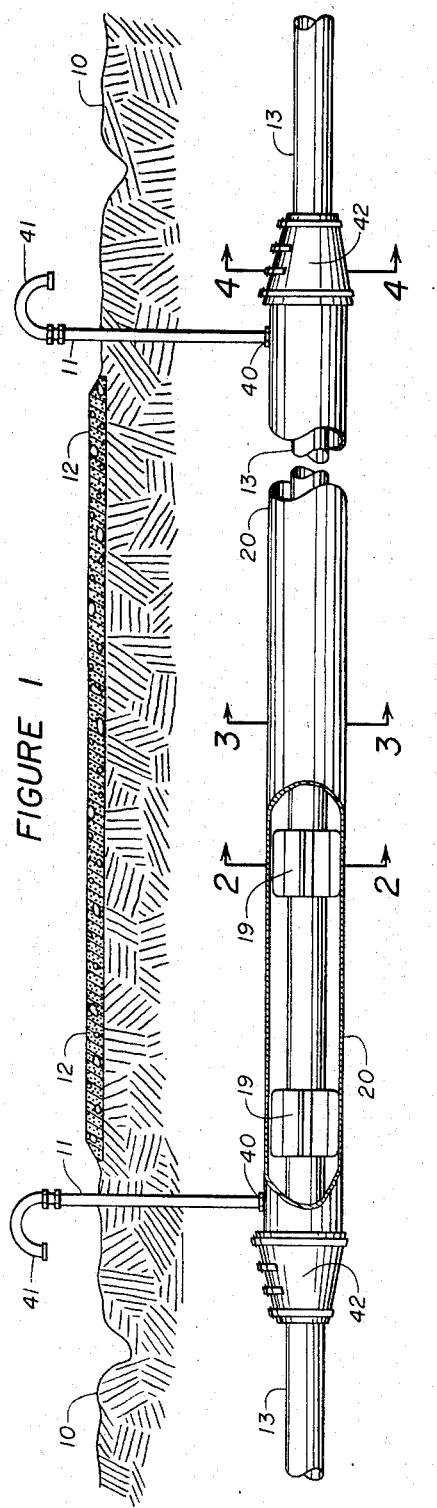

July 28, 1959

J. L. BROADWAY ET AL 2,896,669

PIPE CASEMENT

Filed Jan. 11, 1957

2 Sheets-Sheet 1

HAL L. WHITE and
JACK L. BROADWAY,
inventors
by: *attorney.*

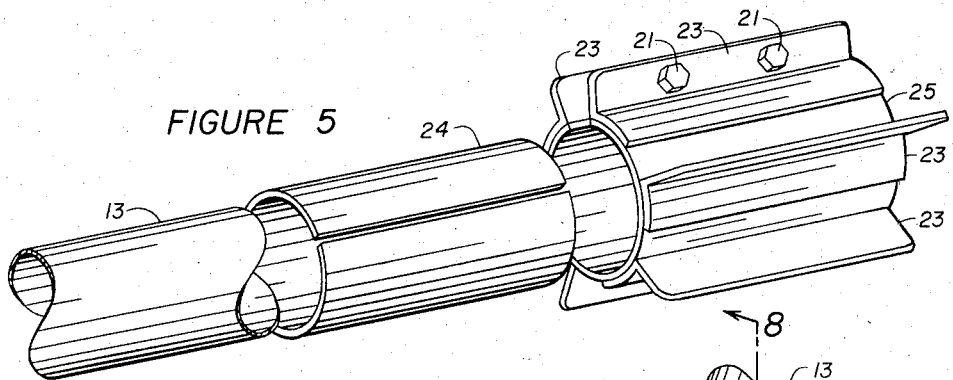
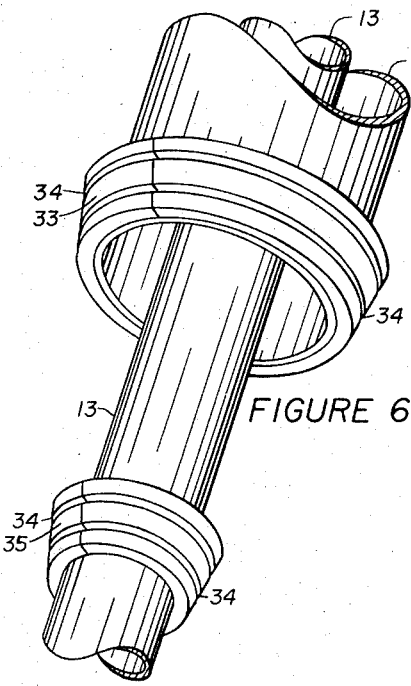
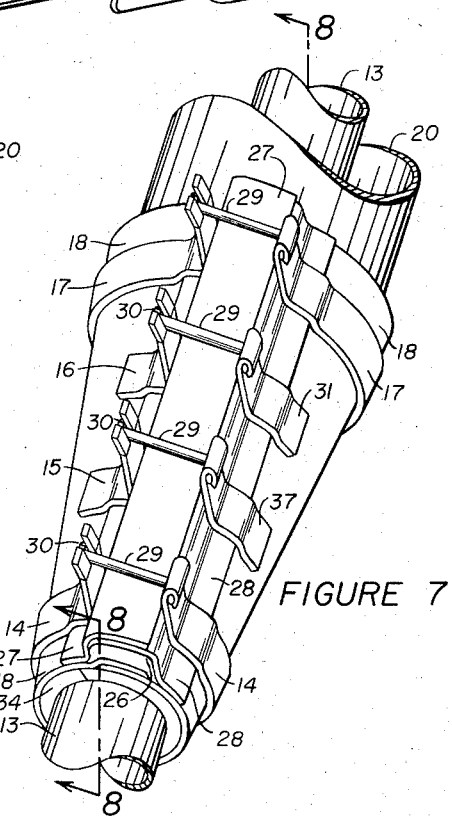
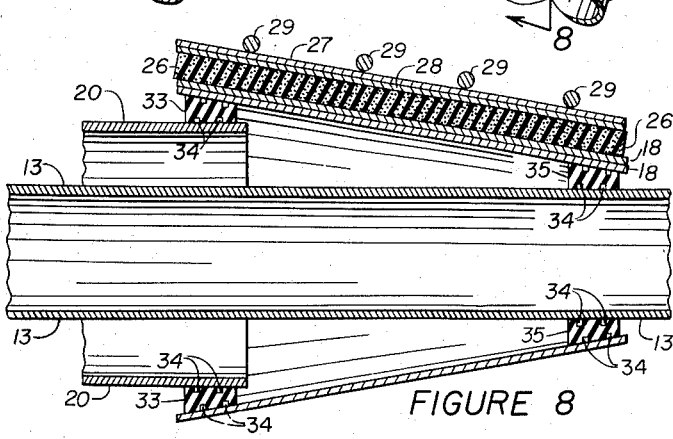

United States Patent Office 2,896,669
Patented July 28, 1959

2,896,669

PIPE CASEMENT

Jack L. Broadway and Hal L. White, North Zulch, Tex.

Application January 11, 1957, Serial No. 633,693

4 Claims. (Cl. 138—65)

Our invention herein disclosed relates to a method of encasing pipe, particularly oil and gas transmission pipe, wherein the transmission pipe is substantially concentrically located within the casement by means of spacers, which also provide a means of inserting the transmission pipe into the casement, and wherein the ends of the casement are sealed to the transmission pipe so that the chamber enclosed thereby is impervious to ground waters and gases.

It has been learned previously by persons skilled in the art of gas and oil transmission, and the means and methods therefore, that it is advantageous to encase transmission pipes either over all or part of their lengths, and particularly to encase such pipes at points whereat they intersect road-beds, railroads, bridges, or like structures or features. It has been learned that such encasement prolongs the useful life of transmission pipes by providing protection from both physical and chemical forces which tend to destroy or alter such pipes.

The destructive potentiality of sufficient physical and mechanical shock or force upon such pipe is obvious. Also, many soils through which gas transmission pipe must pass contain ground waters which carry corrosive substances in solution and many of such soils also contain corrosive gases created by organic matter, the action or decay thereof, and by other sources.

The objects of our invention are:

To provide an inexpensive, easily made sealed casement for the protection of gas and oil transmission pipe.

To provide a means for concentrically spacing a casement about a pipe, particularly a gas transmission pipe, which allows motion of both rotation and translation between the transmission pipe and the casement and also provides a means of readily placing the transmission pipe within the casement.

To provide a casement as aforesaid which prevents, or substantially decreases, the communication of mechanical-physical or electromotive force between the casement and the transmission pipe.

To provide a spacing means as aforesaid that may be placed about a transmission pipe without being passed over the end thereof.

To provide an inexpensive and simple means of sealing a casement to and about a gas transmission pipe.

To provide a sealing means as aforesaid that may be placed about a transmission pipe, without being passed over the end thereof.

While the foregoing objects are paramount, other and lesser objects of our invention will manifest themselves as the specification proceeds.

This specification is to be construed and interpreted in relation with the accompanying drawings which illustrate a specific embodiment of our invention, and wherein like numbers refer to similar parts throughout all figures.

Figure 1 of the accompanying drawings shows an encased portion of a gas or oil transmission pipe, as it would appear in the earth beneath a roadway, with the casement partially cut away to show the detail of its structure.

Figure 2:
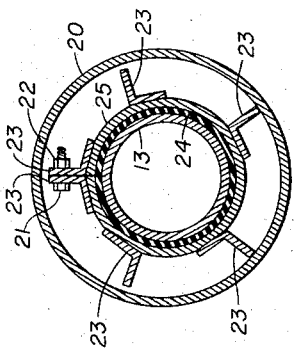

Figure 2 of the accompanying drawings shows an enlarged cross section of the encased pipe of Figure 1 taken on the line 2—2 in the direction shown by the arrows on said line.

Figure 3:
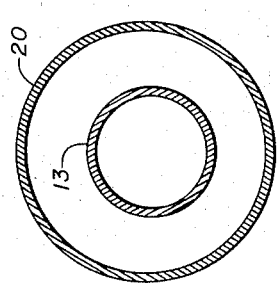

Figure 3 of the accompanying drawings shows an enlarged cross section of the encased pipe of Figure 1 taken on the line 3—3 in the direction shown by the arrows on said line.

Figure 4:
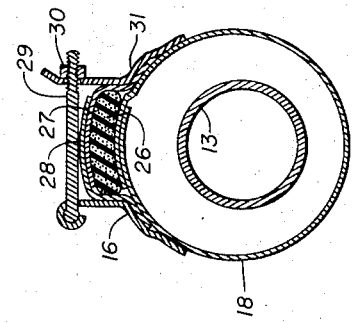

Figure 4 of the accompanying drawings shows an enlarged cross section of the sealing member of the encased pipe of Figure 1 taken on the line 4—4 in the direction shown by the arrows on said line.

Figure 5 of the accompanying drawings shows an isometric "blown-up" illustration of a portion of transmission pipe at a spacer, showing the transmission pipe, insulation and spacer.

Figure 6 of the accompanying drawings shows an isometric illustration of a portion of transmission pipe and casement at a point where the two are joined, showing the two pipes and two sealing gaskets.

Figure 7 of the accompanying drawings is an isometric illustration of the same portion of pipe illustrated in Figure 6, showing, however, the surface view of a complete sealing member.

Figure 8 of the accompanying drawings shows a cross sectional view of Figure 7, illustrating the section thereof taken on the lines 8—8 in the direction shown by the arrows on said lines.

Referring now to Figure 1, there is shown therein a portion of a gas or oil transmission pipe 13 in place in the earth 10 beneath a roadway 12. This transmission pipe 13 is encased, beneath the roadway 12, by the casement 20 and is maintained in a concentrically spaced relation within said casement 20 by means of the spacers 19 and the seals 18.

Gas and oil transmission pipe 13 such as is shown in Figure 1 is commonly composed of metal, most usually a welded seam steel pipe. It has previously been learned that it is desirable to coat such pipe 13 with an asphaltic compound or other similar protective covering (not shown) and to further protect such pipe 13 with paper wrappings or similar devices (not shown) so as to prolong its useful life in the earth. Such pipes are normally manufactured in such lengths as may be conveniently handled, and are coated, over their entire outer surface, except near the ends, with the aforesaid protective compound and wrapping. The lengths of pipe are then connected in the field, usually by welding the butt of one section to that of another, and the protective compound and paper covering placed over the joint thereby created so that the entire outer surface of the pipe 13, is continuous over its entire length, protected from exposure to and direct contact with the earth. Obviously, other materials may be used for the transmission pipe 13 and other methods may be used to join sections of such pipe and protect its outer exposed surface from damage so long as the pipe allows the free flow of gas within and does not allow the flow of gas through the pipe walls and joints to the outside, but such changes would not materially alter the use and application of our invention.

The casement 20 shown in Figure 1 is so designed as to fit about and enclose the transmission pipe 13, substantially as illustrated. We have found that a satisfactory material for construction of the casement 20 is metal, and particularly steel. Steel is quite readily available, easily formed and joined, quite resistant to chemical and physical action and compares favorably in price with other materials possessing such desirable properties. We have found the most desirable cross sectional shape of the casement 20 to be substantially circular. This shape is obviously determined, and to a degree constrained by the essence of our invention, by the cross sectional shape of the transmission pipe 13; though most of such transmission pipes 13 are circular, they well could be of an infinity of other cross sectional shapes, so long as the walls thereof form a closed curve.

The casement 20, as illustrated, is a welded seam steel pipe of appropriate diameter. It is known, as previously stated, that such casement 20, whether buried in the earth or exposed to the atmosphere, have a longer useful life if they are coated with a preservative (not shown). This preservative coating (not shown) may be applied to both the inside and outside of the casement 20. We have found the usual asphaltic protective coatings in common use in the trade to be quite satisfactory for this purpose, though many other materials may function equally well. It is also sometimes advantageous to cover the asphaltic protective coating (not shown) on the outer surface of a casement 20 with paper wrapping (not shown) or other fibrous or plastic material of a similar nature.

The casement 20 is provided with vent pipes 11, usually one at each end, though in a long casement more than two of such vent pipes 11 may be desirable. The vent pipes 11 form a passageway from the internal chamber of the casement 20 communicating with the atmosphere. These vent pipes 11 are fashioned from ordinary pipe of commerce, substantially as shown; they are connected to the casement 20 by means of ordinary pipe fittings 40 and are provided at their exposed opposite ends with a downturned elbow 41, as shown, to prevent rainwater or other matter from entering the vents 11 by force of gravity.

The vent pipes 11 serve to maintain atmospheric, or near atmospheric, conditions within the enclosed chamber of the casement 20 and so serve to prevent the unnecessary accumulation of moisture or other deleterious substances within the enclosed chamber of the casement.

The transmission pipe 13 is maintained within the casement 20, in a substantially concentrically spaced relation therewith, by means of the spacers 19.

The body 25 of the spacer 19 is composed of a pipe-like cylinder 25 with a longitudinal slit in the surface thereof. This slit permits the cylinder 25 to be spread apart and placed about the transmission pipe 13 without being passed over the end of such pipe 13. This feature is advantageous in both the construction and maintenance of pipe lines. The material from which the cylinder 25 is constructed must be such as to be structurally rigid and yet allow the member 25 to be spread apart for placement about a pipe 13 as aforesaid. We have found metal, and particularly steel, to be a satisfactory material for this purpose though other materials, particularly certain plastics possessing the necessary properties aforesaid, well could be used.

The body 25 of the spacer 19 has fastened about it a number of projecting spacing fins 23. The number of these spacing fins 23 is not critical, so long as sufficient to substantially concentrically locate the spacer body 25, and enclosed transmission pipe 13, within the casement 20. We have found that the number of the type of spacing fin 23 illustrated in Figure 2 is preferably six for the spacer 19 to function properly when used in connection with average transmission pipes. This number of spacing fins 23, when symmetrically located on the spacer body 25, causes the weight of the transmission pipe 13 to be supported by two spacing fins, as illustrated.

The spacing fins 23 are conveniently constructed from L-shaped angle bars of the ordinary variety of commerce. These fins 23 may take many shapes and forms and yet fulfill their purpose, and they may be constructed of any structurally rigid material, but we have found preformed L-shaped metal bars to be most convenient and economical. The metal fins 23 may be readily attached to the body of the spacer 25 by means of ordinary methods of welding. If material other than metal were used for construction of the spacing fins 23, it would most probably be necessary to use means other than welding, such as riveting or the like, to attach the fins 23 to the spacer body 25.

The portions of the spacing fins 23 projecting radially from the spacer body 25 are of substantially equal length and this length must be such as to space the spacer body 25, and the enclosed transmission pipe 13, essentially concentrically within the casement 20. The distance from the outer edge of one fin 23 to any other should be somewhat less than the superimposed chord of the cross section of the casement 20 so as to allow for easy insertion of the spacers 19 and transmission pipe 13 into the casement 20 and so as to allow for expansion, contraction, and other motions of the spacer 19 and transmission pipe 13 in relation to the casement 20.

The split spacer body 25 may be fastened about a transmission pipe 13 by means of spacing fins 23 substantially as illustrated in Figure 2 and Figure 5. Two L-shaped fins 23 are fastened by welding, riveting or similar means, back to back, one on each side of the split in the spacer body 25. Two or more mating holes are then produced in each of the radially projecting portions of the two fins to accommodate the bolts 21. The split spacer body 25 may then be fastened together by fastening the two fins 23 together by means of the bolts 21 and nuts 22.

The spacer 19 is secured about the transmission pipe 13 preferably with an insulator 24 therebetween. This insulator 24 is a cylindrical pipe-like structure with a longitudinal split therein, as best shown in the "blown-up" drawing of Figure 5. The split serves to allow the insulator to be spread apart and placed about a transmission pipe 13 without being placed over the end of such pipe 13. The insulator 24 should preferably be of such thickness, and composed of such material, as to prevent or substantially lessen the communication of a physical-mechanical shock or electromotive force between the transmission pipe 13 and the spacer 19 and casement 20; as to allow the insulator 24 to spread sufficiently to be placed around a transmission pipe 13; and yet not be too large and bulky to serve its purpose efficiently. We have found rubber to be the preferable material for this insulator 24 through plastic or similar material possessing similar attributes may equally well be used.

The radially projecting portions of the spacing fins 23 serve to assist in placing the transmission pipe 13 within the casement 20, as well as spacing it therein. These fins 23 are constructed with rounded corners on the radially projection portion so that, during construction of a pipe line, these fins 23 may serve as runners on the transmission pipe 13 to insert it within a casement 20.

In constructing gas and oil transmission pipe-lines of the nature here considered, the practice has been established, where possible, to dig a ditch, place the joined and covered pipe in the ditch and then cover it. Often in crossing roadways, railways, waterways, or the like, it is more desirable to place the casement 20 and transmission pipe 13 thereunder by means of a tunnel or thereover by means of a trestle or bridge or the like. In any of these events, at one stage or another of construction if a casement 20 is to be used it becomes necessary to insert the transmission pipe 13, or portions thereof, into the casement 20. It is in performing this operation that the fins 23 of the spacers 19 serve as runners and guides for the transmission pipe 13.

To construct such a gas or oil transmission pipeline as here considered a roadway, railway, watercourse or like structure or feature, the casement 20 is established in proper position thereunder or thereover. Insulators 24 and spacers 19 are then placed in appropriate positions about a portion of transmission pipe 13 of a length somewhat longer than the casement 20 in question. We have found that these insulators 24 and spacers 19 should be established at intervals of some ten or twelve feet along the transmission pipe 13, but it must be realized that this spacing is dependent to a great extent upon the nature and design of the particular members employed. The transmission pipe 13, with insulators 24 and spacers 19 affixed, is then inserted through the positioned casement 20. It is in this process that the radially projecting portions of the fins 23 of the spacers 19 serve as runners to guide the transmission pipe 13 through the casement 20 without becoming fouled therein upon seams, surface irregularities or other features. When the portion of transmission pipe 13 aforesaid has been inserted through the casement 20, it may be connected to the transmission pipeline by welding or other well known methods, and the casement 20 sealed thereto with the seal 42 hereinafter described.

If a long section of transmission pipe 13 is to be encased, it may, for ease of handling, become necessary to perform the casing operations aforesaid on each of several portions of pipe and then join the several portions together to form the single completed unit. The basic principles of encasing the pipe, however, as aforesaid, remains the same.

The complete casing seals 42 serve to seal each of the casements 20 to the transmission pipe 13, thereby producing an enclosed chamber within the casement 20, about the transmission pipe 13, which communicates outside the casement 20 only by means of the vent pipes 11.

A view of a portion of transmission pipe 13 near the end of a casement 20 is shown in Figure 6, with the casing seal gasket 33 and the pipe seal gasket 35 in place. These gaskets 33, 35 are truncated conic-like structures, substantially as illustrated, with a hole in the center thereof to accommodate the respective pipes 13, 20 about which the gaskets 33, 35 fit. The angle of the elements of the outer surface of these gaskets is such as to fit against the sealing member 18 of the casement seal 42. The surfaces of each of these gaskets is provided with a series of circular grooves, 34 which are believed to aid in creating a better seal between the gaskets 33, 35 and the pipes 20, 13 and between the gaskets 33, 35 and the sealing member 18.

The gaskets 33, 35 have a slit therethrough perpendicular to a diameter and parallel to a surface element thereof, to provide a means of placing them about the respective pipes 13, 20 over which they fit, without placing them over the end of such pipes 13, 20. We prefer rubber as material for the construction of the sealing gaskets 33, 35, though many other materials which have sufficient structural rigidity, resist the passage of, or tend to dissipate, physical-mechanical shock and electromotive force and create an efficient seal with metal, could well be substituted.

A seal is created between the casement 20 and the transmission pipe 13 by means of the sealing member 18 which fits about and between the sealing gaskets 33 and 35, substantially as illustrated. This sealing member 18 is constructed from a sheet of metal in such fashion that, when wrapped about the two sealing gaskets, 33, 35, a truncated cone is formed, sealed at one end to the gasket 33 and thereby to the casement 20 and sealed at the other end to the gasket 35 and thereby to the transmission pipe 13. We prefer stainless steel for the construction of this sealing member 18, though many other materials with sufficient structural rigidity, corrosion resistance and other similar properties would serve equally well.

The two edges of the sealing member 18 are allowed to overlap substantially as illustrated in Figure 7 and the cross section of Figure 8, and a means for cinching and tightening the sealing member 18 is provided thereover.

This means for tightening the sealing member 18 about the gaskets 33, 35 consists of the bands 14, 17, the straps 15, 16, 31, 37, and the bolts 29 and nuts 30, all constructed and assembled substantially as shown in Figure 7. The straps 15, 16 and bands 14, 17 abut on the bracket 28 on the other side of the overlapped portion of the sealing member 18. Thus, when the nuts 30 are tightened upon the screws 29, a pressure is created which causes the straps 15, 16, 31, 37 and the opposite ends of the bands 14, 17 to approach, and, thereby, the ends of the sealing member 18 are overlapped to a greater degree and the entire sealing member 18 is thereby tightened about the gaskets 33 and 35.

We prefer iron or steel as material for construction of the bands 14, 17, the straps 15, 16, 31, 37, and the brackets 27, 28 as this material has sufficient structural rigidity to accomplish the necessary functions given these parts and it also may be easily fabricated and assembled. These bands 14, 17 and straps 15, 16, 31, 37 are attached preferably by welding or riveting to the sealing member 18.

The joint resulting from the overlapping of the edges of the sealing member 18 is sealed by means of a gasket 26 and the overlapping brackets 27 and 28. These brackets 27, 28 are designed and constructed substantially as shown in Figures 7 and 8. When the sealing member 18 is tightened by means of the bolts 29 and nuts 30, pressure is exerted by means of the brackets 27, 28 upon the gasket 26 and the joint formed by the overlap of the edges of the sealing member 18 thereby sealed by the gasket 26. We prefer rubber as material for the construction of the gasket 26, though this material is not critical and many other materials would function equally well. The brackets 27, 28 are preferably formed from commercial iron or steel as aforesaid.

Although the foregoing description is necessarily of a detailed specific character in order that a specific embodiment of our invention may be completely set forth, it is to be understood that the specific terminology and structure is not intended to be restrictive or confining, and that various rearrangements of parts and modifications of detail may be resorted to without departing from the essence, scope or spirit of the invention herein disclosed and hereinafter claimed.

Having thusly described our invention, what we desire to protect by Letters Patent and,

What we claim is:

1. A spacer for spacing an encased pipe substantially concentrically within a casement comprising, in combination, a tubular body having a longitudinal slit therein on the upper portion thereof permitting said member to be placed about an encased pipe without being placed over the end thereof; and a plurality of elongate fins, having an "L" shaped cross-section, fastened at substantially equal intervals to the outside of the said tubular body, parallel to each other and to the axis of the said body, and having the other leg thereof, of a length somewhat less than the difference between the inside diameter of a casement and the outside diameter of a pipe to be encased, projecting radially therefrom, with the corners of said radially projecting legs rounded to assist in the skidding of said pipe to be encased, and two of said upward radially projecting fins fastened adjacent and parallel to the slit in the said tubular body with the legs of the said two fins extending away from the said slit, and holes therein to allow the legs of the said fins to be drawn together by means of bolts extending therethrough having nuts thereon.

2. The spacing member of claim 1 in combination with a pipe casement and an encased pipe.

3. A device for sealing the ends of a casement about an encased pipe comprising in combination, a relatively narrow truncated conical encased pipe gasket, adapted to fit within a sealing member, and having a cylindrical hole therethrough adapted to fit about an encased pipe, a slit therein to permit said gasket to be inserted about a pipe, and sealing grooves in the outer surface parallel to the base thereof; a similar casement gasket of larger size having a cylindrical hole therein adapted to fit about a casement; a relatively thin truncated conic sealing member having overlapping brackets attached substantially parallel to and near the overlapping edge thereof and an elongated gasket between the overlapping portion of said brackets and the joint of said sealing member and bands fastened about the said sealing member, near the ends thereof, and opposing paired straps fastened to the sealing member therebetween, the ends of said bands and straps projecting above said brackets and being provided with holes to allow bolts to be inserted through opposing pairs thereof with nuts thereon to cause the overlapping portions of said sealing member and said brackets to be forced together to cause a sealing pressure to be exerted on all of the aforesaid gaskets.

4. The sealing member of claim 3 in combination with a pipe casement and an encased pipe.

References Cited in the file of this patent

UNITED STATES PATENTS

| | | |
|---|---|---|
| Re. 23,545 | Bond | Sept. 9, 1952 |
| 1,913,018 | Berryman | June 6, 1933 |
| 2,227,551 | Morris | Jan. 7, 1941 |
| 2,449,795 | Stillwagon | Sept. 21, 1948 |
| 2,594,551 | Gist | Apr. 29, 1952 |
| 2,735,449 | Grahame | Feb. 21, 1956 |
| 2,749,944 | Williamson | June 12, 1956 |
| 2,750,963 | Bond | June 19, 1956 |
| 2,765,182 | Williamson | Oct. 2, 1956 |